US011765501B2

(12) United States Patent
Eswara et al.

(10) Patent No.: US 11,765,501 B2
(45) Date of Patent: Sep. 19, 2023

(54) VIDEO SURVEILLANCE SYSTEM WITH AUDIO ANALYTICS ADAPTED TO A PARTICULAR ENVIRONMENT TO AID IN IDENTIFYING ABNORMAL EVENTS IN THE PARTICULAR ENVIRONMENT

(71) Applicant: Honeywell International Inc., Charlotte, NC (US)

(72) Inventors: Lalitha M. Eswara, Bangalore (IN); Syed Omar Khaiyam, Bangalore (IN); Siddharth Sonkamble, Mumbai (IN); Deepak Kaul, St. Charles, IL (US); K Karthikeyan, Tamilnadu (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/197,679

(22) Filed: Mar. 10, 2021

(65) Prior Publication Data
US 2022/0295176 A1    Sep. 15, 2022

(51) Int. Cl.
*H04R 3/00*        (2006.01)
*G08B 13/16*     (2006.01)
(Continued)

(52) U.S. Cl.
CPC ........... *H04R 3/005* (2013.01); *G06F 18/214* (2023.01); *G08B 13/1672* (2013.01);
(Continued)

(58) Field of Classification Search
None
See application file for complete search history.

(56) References Cited

U.S. PATENT DOCUMENTS

| 7,076,102 B2 | 7/2006 | Lin et al. |
| 8,938,404 B2 | 1/2015 | Capman et al. |

(Continued)

FOREIGN PATENT DOCUMENTS

| GB | 2563892 A | 1/2019 |
| WO | 2016098315 A1 | 6/2016 |
| WO | 2019159103 A1 | 8/2019 |

OTHER PUBLICATIONS

Audio Analytic-enabling intelligent products through sound recognition 2020. https://www.audioanalytic.com accessed Dec. 22, 2020.

(Continued)

*Primary Examiner* — James K Mooney
(74) *Attorney, Agent, or Firm* — Seager, Tufte & Wickhem, LLP

(57) ABSTRACT

Methods and systems for identifying abnormal sounds in a particular environment. A normal audio stream obtained in the absence of abnormal sounds may be used as a baseline for subsequently processing an incoming audio stream with a processor to determine whether the incoming audio stream from the microphone in the particular environment includes an abnormal audio event for the particular environment. When it is determined that the incoming audio stream includes an abnormal audio event for the particular environment an electronic database may be accessed to determine a location of the abnormal audio event in the particular environment. A video camera with a field of view that includes the location of the abnormal audio event in the particular environment may be identified and the video stream from the identified video camera retrieved and displayed.

19 Claims, 8 Drawing Sheets

(51) Int. Cl.
  *G08B 13/196* (2006.01)
  *H04R 5/04* (2006.01)
  *G06F 18/214* (2023.01)

(52) U.S. Cl.
  CPC ........... *G08B 13/1963* (2013.01); *H04R 5/04* (2013.01); *H04R 2201/40* (2013.01)

(56) References Cited

U.S. PATENT DOCUMENTS

| | | | |
|---|---|---|---|
| 2002/0055840 A1* | 5/2002 | Yamada | G10L 15/20 704/E15.039 |
| 2006/0004579 A1* | 1/2006 | Claudatos | G08B 13/19695 704/270 |
| 2006/0227237 A1 | 10/2006 | Kienzle et al. | |
| 2010/0128446 A1* | 5/2010 | DiPoala | H05K 5/0256 361/729 |
| 2012/0002047 A1 | 1/2012 | An et al. | |
| 2016/0163168 A1* | 6/2016 | Brav | G08B 29/188 381/56 |
| 2016/0241818 A1* | 8/2016 | Palanisamy | G08B 13/16 |
| 2017/0019639 A1 | 1/2017 | Bae | |
| 2017/0064262 A1* | 3/2017 | Mozer | G08B 13/19682 |
| 2017/0154638 A1* | 6/2017 | Hwang | G01S 5/28 |
| 2019/0236416 A1 | 8/2019 | Wang et al. | |

OTHER PUBLICATIONS

Audio Analytics Help Prevent Escalations, The Milestone Post, May 31, 2016, https://news.milestonesys.com/audioanalyticshelp-preventescalations/ accessed Dec. 22, 2020.

Audio Analytics for Smart Cameras, Intelli-Vision, 2020, https://Intelli-Vision.com/ accessed Dec. 22, 2020.

Security Cameras with Audio, Microphone CCTV Cameras|CCTVCameraWorld https://www.cctvcameraworld.com/security-cameras-with-audio.html accessed Dec. 22, 2020.

Stepien et al; "Why Real Sounds Matter for Machine Learning," Audio Analytics, 2020.

Technology-Audio Analytic/Cutting edge ML technology, Audio Analytics, 2020, https://www.audioanalytic.com/technology/ accessed Dec. 22, 2020.

Use cases-Audio Analytic|Embrace the power of sound recognition| 2020, https://www.audioanalytic.com/use-cases/accessed Dec. 22, 2020.

Extended European Search Report, European Patent Office, EP Application No. 22157448.6, dated Jul. 6, 2022 (10 pgs).

* cited by examiner

VIDEO SURVEILLANCE SYSTEM WITH AUDIO ANALYTICS ADAPTED TO A PARTICULAR ENVIRONMENT TO AID IN IDENTIFYING ABNORMAL EVENTS IN THE PARTICULAR ENVIRONMENT

TECHNICAL FIELD

The disclosure generally relates to video surveillance systems, and more particularly to video surveillance systems that use audio to help identify abnormal events in the surveilled environment.

BACKGROUND

Audio analytics is becoming more popular in the video surveillance arena due to its advantage of providing complementary information for facility surveillance. In many cases, to detect abnormal audio events, separate audio analytics modules are developed and trained to detect a corresponding audio event. For example, one audio analytics module may be developed and trained to detect gun shots, while another audio analytics module may be developed and trained to detect screams. These trained one audio analytics may be purchased from various vendors for use.

Each of these audio analytics modules is typically applied to an incoming audio stream, independently of the others, to detect a corresponding audio event. In use, there may be tens, hundreds or even thousands of audio analytics modules running to detect the desired range of audio event types that are of interest in a surveilled environment. Also, each environment may require a different set of audio analytics modules. For example, children screaming in a school may not be of high interest, but children screaming in an airport can be a serious abnormality. Also, background noises in a particular surveilled environment can interfere with the reliability of these off-the-shelf audio analytics modules because the audio analytics modules are typically developed and trained without similar background noises.

SUMMARY

The disclosure generally relates to video surveillance systems, and more particularly to video surveillance systems that use audio to help identify abnormal events in the surveilled environment. In one example, a method identifying abnormal sounds in a particular environment includes receiving a normal audio stream from a microphone located in the particular environment when no abnormal audio events are present, and using at least part of the normal audio stream as a baseline for subsequently processing an incoming audio stream to determine whether the incoming audio stream from the microphone in the particular environment includes an abnormal audio event for the particular environment. When it is determined that the incoming audio stream includes an abnormal audio event for the particular environment, the method may access an electronic database to determine a location of the abnormal audio event in the particular environment, identify a video camera with a field of view that includes the location of the abnormal audio event in the particular environment, and retrieve and display on a display a video stream from the identified video camera.

Alternatively, or additionally to any of the examples above, in another example, the normal audio stream may be received during a training mode.

Alternatively or additionally to any of the examples above, in another example, during the training mode, the method may further include dividing the normal audio stream into a plurality of normal audio clips, preparing a plurality of abnormal audio clips by superimposing known abnormal audio events onto one or more of the plurality of normal audio clips, and training an audio classification model to identify abnormal audio events in the particular environment using one or more of the plurality of normal audio clips and the plurality of abnormal audio clips.

Alternatively, or additionally to any of the examples above, in another example, the audio classification model may be used in determining whether the incoming audio stream from the particular environment during an operation mode includes an abnormal audio event for the particular environment.

Alternatively, or additionally to any of the examples above, in another example, the audio classification model may be a self-learning model.

Alternatively, or additionally to any of the examples above, in another example, the self-learning model may use reinforcement learning and/or transfer learning.

Alternatively, or additionally to any of the examples above, in another example, the method may further include presenting one or more determined abnormal audio event to an operator, receiving a classification from the operator that the determined abnormal audio event is indeed an abnormal audio event or should be considered a normal audio event for the particular environment, and updating the audio classification model based on the classification received from the operator.

Alternatively, or additionally to any of the examples above, in another example, determining the location of the abnormal audio event in the particular environment may be based at least in part on a physical location of the microphone in the particular environment stored in the electronic database.

Alternatively, or additionally to any of the examples above, in another example, the microphone may be a directional microphone with a directional orientation, and wherein determining the location of the abnormal audio event in the particular environment may be is based at least in part on the physical location of the microphone in the particular environment and the directional orientation of the microphone.

Alternatively, or additionally to any of the examples above, in another example, the video camera may include a housing that houses the microphone, and provides the incoming audio stream and the video stream.

Alternatively, or additionally to any of the examples above, in another example, the video camera may be housed separately from the microphone, and the microphone may be addressed separately from the video camera.

Alternatively, or additionally to any of the examples above, in another example, the method may further include sending an alert to an operator when it is determined that the incoming audio stream includes an abnormal audio event for the particular environment.

In another example, a method for identifying abnormal sounds in a particular environment may include entering a training mode. While in the training mode, the method may include capturing real time audio from a plurality of microphones in the particular environment, splitting the real time audio into a plurality of audio files, saving at least some of the plurality of audio files as normal audio files containing normal audio signatures for the particular environment, superimposing abnormal audio signatures onto at least some of the plurality of normal audio files and saving the resulting files as abnormal audio files containing abnormal audio signatures, and training an audio classification model using the normal audio files and the abnormal audio files. The method may further include entering an operational mode. While in the operational mode, the method may include capturing real time audio from each of the plurality of microphones, splitting the real time audio into a plurality of operational audio files, processing the operational audio files using the audio classification model via a processor to identify one or more abnormal audio signatures in the particular environment, determining a location of one of the abnormal audio signatures in the particular environment, and retrieving and displaying on a display a video stream from a video camera that has a field of view that includes the location.

Alternatively, or additionally to any of the examples above, in another example, the method may further include receiving a user input confirming or rejecting the identification of the abnormal audio signatures.

Alternatively, or additionally to any of the examples above, in another example, the audio classification model may be updated based on the user input.

Alternatively, or additionally to any of the examples above, in another example, the audio classification model may be a self-learning model.

Alternatively, or additionally to any of the examples above, in another example, the self-learning model may use reinforcement learning and/or transfer learning.

In another example, a system for identifying abnormal sounds in a particular environment may include a memory for storing an audio classification model, a display, and a controller operatively coupled to the memory and the display. The controller may be configured to receive a normal audio stream from a microphone located in the particular environment when no abnormal audio events are present, use at least part of the normal audio stream as a baseline for training the audio classification model to identify whether an incoming audio stream from the microphone includes an abnormal audio event for the particular environment, use the trained audio classification model to determine whether the incoming audio stream from the microphone includes an abnormal audio event for the particular environment, when it is determined that the incoming audio stream includes an abnormal audio event for the particular environment, determine a location of the abnormal audio event in the particular environment, identify a video camera with a field of view that includes the location of the abnormal audio event in the particular environment, and retrieve and display on the display a video stream from the identified video camera.

Alternatively, or additionally to any of the examples above, in another example, the audio classification model may be a self-learning model.

Alternatively or additionally to any of the examples above, in another example, the controller may be further configured to present one or more determined abnormal audio event to an operator via the display, receive a classification from the operator that the determined abnormal audio event is indeed an abnormal audio event or should be considered a normal audio event for the particular environment, and update the audio classification model based on the classification received from the operator.

In another example, an audio-video camera for capturing audio and video of a particular environment may comprise a housing, a camera housed by the housing for providing a video stream, one or more directional microphones each configured to receive sound from a primary audio direction, wherein the one or more directional microphones are carried by the housing such that the primary audio direction for each of the one or more directional microphones is orientated in a different direction from the housing such that an approximate direction of a sound event emanating from the particular environment can be determined and, a controller housed by the housing, the controller operatively coupled to the camera and each of the one or more directional microphones, the controller configured to provide an audio and video output to a remote device.

Alternatively or additionally to any of the examples above, in another example, the camera may be a Pan Tilt Zoom (PTZ) camera having a field of view. The controller may be configured to: determine the approximate direction of the sound event emanating from the particular environment using the one or more directional microphones and control the field of view of the PTZ camera to face the determined approximate direction of the sound event in order to capture a video stream of a source of the sound event.

Alternatively or additionally to any of the examples above, in another example, the primary directions of the one or more directional microphones may be orientated to have a uniform angular spacing.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
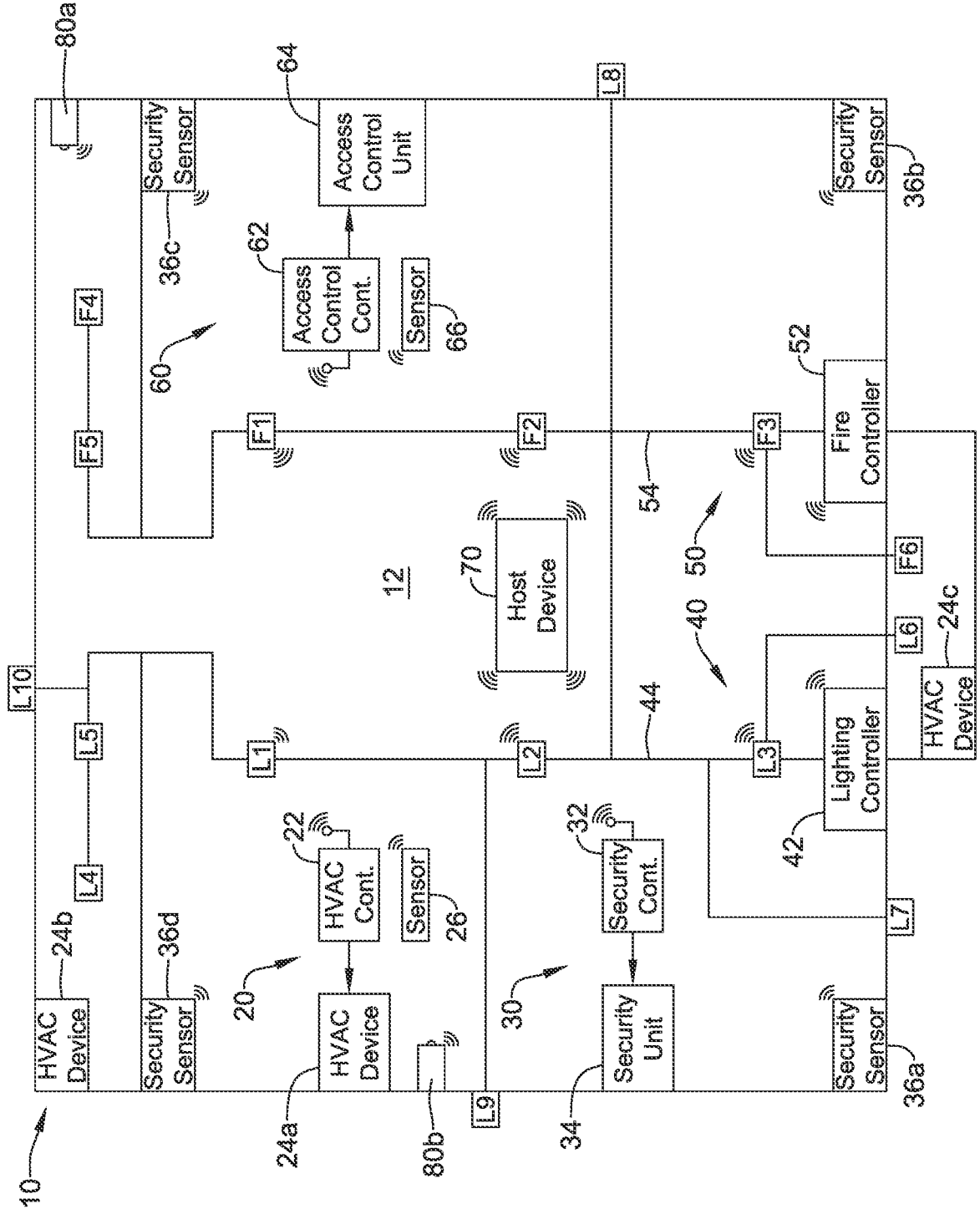
FIG. 1 is a schematic diagram of an illustrative building or other structure that includes, among other things, a video surveillance system.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The description and the drawings, which are not necessarily to scale, depict illustrative embodiments and are not intended to limit the scope of the disclosure. The illustrative embodiments depicted are intended only as exemplary. Some or all of the features of any illustrative embodiment can be incorporated into other illustrative embodiments unless clearly stated to the contrary.

The various systems and/or methods described herein may be implemented or performed with a general-purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In some cases, methods or systems may utilize a dedicated processor or controller. In other cases, methods or systems may utilize a common or shared controller. Whether a system or method is described with respect to a dedicated controller/processor or a common controller/processor, each method or system can utilize either or both a dedicated controller/processor or a common controller/processor. For example, single controller/processor can be used for a single method or system or any combination of methods or systems. In some cases, system or method may be implemented in a distributed system, where parts of the system or method are distributed among various components of the distributed system. For example, some parts of a method may be performed locally, while other parts may be performed by a remote device such as a remote server. These are just examples.

Public areas, such as, but not limited to, commercial buildings, manufacturing facilities, airports, transportation hubs, schools, malls, shopping centers, arenas, stadiums, etc., may use surveillance cameras to provide security to the area. In some cases, it may be desirable to include audio analytics to complement video surveillance for facility security or surveillance. For example, audio analytics may be used to identify abnormal or worrisome noises, such as, but not limited to, fire alarms, looters, screams, shouts, gunshots, or noises from abnormal equipment or crackling noises. Currently, to detect abnormal audio events, separate audio analytics modules are developed and trained to detect a corresponding audio event. For example, one audio analytics module may be developed and trained to detect gun shots, while another audio analytics module may be developed and trained to detect screams. These trained one audio analytics can be purchased from various vendors for use.

Each of these audio analytics modules is typically applied to an incoming audio stream, independently of the others, to detect a corresponding audio event. In use, there may be tens, hundreds or even thousands of audio analytics modules running to detect the desired range of audio event types that are of interest in a surveilled environment. Also, each environment may require a different set of audio analytics modules. For example, children screaming in a school may not be of high interest, but children screaming in an airport can be a serious abnormality. Also, background noises in a particular surveilled environment can interfere with the reliability of these off-the-shelf audio analytics modules because the audio analytics modules are typically developed and trained without similar background noises.

Moreover, sound localization of an abnormality may be limited to the camera that detects the abnormality. Largely, microphones that are attached to cameras today are omnidirectional. When so provided, the camera may be pointing in one direction while the audio is captured at an orientation that is not seen in the camera, which inhibits accurate sound localization. The present disclosure overcomes these and other limitations of current video surveillance systems.

Turning to FIG. 1, which is a schematic view of an illustrative building or structure 10 that includes a building management system (BMS) 12 for controlling one or more client devices servicing the building or structure 10. The illustrative BMS 12 includes a security system, an HVAC system, a lighting control system and a fire control system. The security system includes a video surveillance system includes a number of video cameras and audio sensors (e.g. microphones) disposed throughout the environment. The BMS 12, as described herein according to the various illustrative embodiments, may be used to control one or more client devices in order to control and/or monitor certain environmental conditions (e.g., temperature, ventilation, humidity, lighting, security, etc.). Such a BMS 12 may be implemented in, for example, office buildings, factories, manufacturing facilities, distribution facilities, retail buildings, hospitals, health clubs, airports, transportation hubs, schools, shopping centers, movie theaters, restaurants, and even residential homes, among other places. While the BMS 12 is described with respect to a building it should be understood that the BMS 12, or portions thereof, may be used in outdoor environments as well.

The BMS 12 shown in FIG. 1 includes one or more heating, ventilation, and air conditioning (HVAC) systems 20, one or more security systems 30, one or more lighting systems 40, one or more fire systems 50, and one or more access control systems 60. These are just a few examples of systems that may be included or controlled by the BMS 12. In some cases, the BMS 12 may include more or fewer systems depending on the needs of the building. For example, some buildings may also include refrigeration systems or coolers. In another example, the BMS 12 may only include a video surveillance system.

In some cases, each system may include a client device configured to provide one or more control signals for monitoring and/or controlling one or more building control components and/or devices of the BMS 12. For instance, in some cases, the HVAC system 20 may include an HVAC control device 22 used to communicate with and control one or more HVAC devices 24a, 24b, and 24c (collectively, 24) for servicing the HVAC needs of the building or structure 10. While the HVAC system 20 is illustrated as including three devices, it should be understood that the structure may include fewer than three or more than three devices 24, as desired. Some illustrative devices may include, but are not limited to a furnace, a heat pump, an electric heat pump, a geothermal heat pump, an electric heating unit, an air conditioning unit, a roof top unit, a humidifier, a dehumidifier, an air exchanger, an air cleaner, a damper, a valve, blowers, fans, motors, air scrubbers, ultraviolet (UV) lights, and/or the like. The HVAC system 20 may further include a system of ductwork and air vents (not explicitly shown). The HVAC system 20 may further include one or more sensors or devices 26 configured to measure parameters of the environment to be controlled. The HVAC system 20 may include more than one sensor or device of each type, as needed to control the system. It is contemplated that large buildings, such as, but not limited to an office building, may include a plurality of different sensors in each room or within certain types of rooms. The one or more sensors or devices 26 may include, but are not limited to, temperatures sensors, humidity sensors, carbon dioxide sensors, pressure sensors, occupancy sensors, proximity sensors, etc. Each of the sensor/devices 26 may be operatively connected to the control device 22 via a corresponding communications port (not explicitly shown). It is contemplated that the communications port may be wired and/or wireless. When the communications port is wireless, the communications port may include a wireless transceiver, and the control device 22 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

In some cases, the security system 30 may include a security control device 32 used to communicate with and control one or more security units 34 for monitoring the building or structure 10. The security system 30 may further include a number of sensors/devices 36a, 36b, 36c, 36d (collectively, 36). The sensor/devices 36 may be configured to detect threats within and/or around the building 10. In some cases, some of the sensor/devices 36 may be constructed to detect different threats. For example, some of the sensor/devices 36 may be limit switches located on doors and windows of the building 10, which are activated by entry of an intruder into the building 10 through the doors and windows. Other suitable security sensor/devices 36 may include fire, smoke, water, carbon monoxide, and/or natural gas detectors, to name a few. Still other suitable security system sensor/devices 36 may include motion sensors that detect motion of intruders in the building 10, noise sensors or microphones that detect the sound of breaking glass or other sounds in the environment, security card pass systems, or electronic locks, etc. It is contemplated that the motion sensor may be a passive infrared (PIR) motion sensor, a microwave motion sensor, a millimeter wave indoor radar sensor, an ultrasonic motion sensor, a tomographic motion sensor, a video camera having motion detection software, a vibrational motion sensor, etc. In some cases, one or more of the sensor/devices 36 may include a video camera with or without sound sensors or microphones incorporated into the housing thereof. In some cases, the sensor/devices 36 may include a horn or alarm, a damper actuator controller (e.g., that closes a damper during a fire event), a light controller for automatically turning on/off lights to simulate occupancy, and/or any other suitable device/sensor. These are just examples.

In some cases, the lighting system 40 may include a lighting control device 42 used to communicate with and control one or more light banks 44 having lighting units L1-L10 for servicing the building or structure 10. In some embodiments, one or more of the lighting units L1-L10 may be configured to provide visual illumination (e.g., in the visible spectrum) and one or more of the light units L1-L10 may be configured to provide ultraviolet (UV) light to provide irradiation, sometimes for killing pathogens on surfaces in the building. One or more of the light units L1-L10 may include a multi-sensor bundle, which may include, but is not limited to, humidity sensors, temperature sensors, microphones, motion sensors, etc. The lighting system 40 may include emergency lights, outlets, lighting, exterior lights, drapes, and general load switching, some of which are subject to "dimming" control which varies the amount of power delivered to the various building control devices.

In some cases, the fire system 50 may include a fire control device 52 used to communicate with and control one or more fire banks 54 having fire units F1-F6 for monitoring and servicing the building or structure 10. The fire system 50 may include smoke/heat sensors, a sprinkler system, warning lights, and so forth.

In some cases, the access control system 60 may include an access control device 62 used to communicate with and control one or more access control units 64 for allowing access in, out, and/or around the building or structure 10. The access control system 60 may include doors, door locks, windows, window locks, turnstiles, parking gates, elevators, or other physical barriers, where granting access can be electronically controlled. In some embodiments, the access control system 60 may include one or more sensors 66 (e.g., RFID, etc.) configured to allow access to the building or certain parts of the building 10.

In a simplified example, the BMS 12 may be used to control a single HVAC system 20, a single security system 30, a single lighting system 40, a single fire system 50, and/or a single access control system 60. In other embodiments, the BMS 12 may be used to communicate with and monitor/control multiple discrete building control devices 22, 32, 42, 52, and 62 of multiple systems 20, 30, 40, 50, 60. The devices, units, and controllers of the systems 20, 30, 40, 50, 60 may be located in different zones and rooms, such as a common space area (a lobby, a break room, etc.), in a dedicated space (e.g., offices, work rooms, etc.), or outside of the building 10. In some cases, the systems 20, 30, 40, 50, 60 may be powered by line voltage, and may be powered by the same or different electrical circuit. It is contemplated that the BMS 12 may be used to control other suitable building control components that may be used to service the building or structure 10.

According to various embodiments, the BMS 12 may include a host device 70 that may be configured to communicate with the discrete systems 20, 30, 40, 50, 60 of the BMS 12. In some cases, the host device 70 may be configured with an application program that assigns devices of the discrete systems to a particular device (entity) class (e.g., common space device, dedicated space device, outdoor lighting, unitary controller, and so on). In some cases, there may be multiple hosts. For instance, in some examples, the host device 70 may be one or many of the control devices 22, 32, 42, 52, 62. In some cases, the host device 70 may be a hub located external to the building 10 at an external or remote server also referred to as "the cloud."

In some cases, the building control devices 22, 32, 42, 52, 62 may be configured to transmit a command signal to its corresponding building control component(s) for activating or deactivating the building control component(s) in a desired manner. In some cases, the building control devices 22, 32, 42, 52, 62 may be configured to receive a classification of the building control component and may transmit a corresponding command signal(s) to their respective building control component in consideration of the classification of the building control component.

In some instances, the building control devices 22, 32, 62 may be configured to receive signals from one or more sensors 26, 36, 66 located throughout the building or structure 10. In some cases, the building control devices 42 and 52 may be configured to receive signals from one or more sensors operatively and/or communicatively coupled with the lighting units L1-L10 and the fire units F1-F6 located throughout the building or structure 10, respectively. In some cases, the one or more sensors may be integrated with and form a part of one or more of their respective building control devices 22, 32, 42, 52, 62. In other cases, one or more sensors may be provided as separate components from the corresponding building control device. In still other instances, some sensors may be separate components of their corresponding building control devices while others may be integrated with their corresponding building control device. These are just some examples. The building control devices 22, 32, 42, 52, 62 and the host device 70 may be configured to use signal(s) received from the one or more sensors to operate or coordinate operation of the various BMS systems 20, 30, 40, 50, 60 located throughout the building or structure 10. As will be described in more detail herein, the building control devices 22, 32, 42, 52, 62 and the host device 70 may be configured to use signal(s) received from the one or more sensors to detect and localize abnormal noises.

The one or more sensors 26, 36, 66, L1-L10, and F1-F6 may be any one of a temperature sensor, a humidity sensor, an occupancy sensor, a pressure sensor, a flow sensor, a light sensor, a sound sensor (e.g., microphone), a video camera, a current sensor, a smoke sensor, and/or any other suitable sensor. In one example, at least one of the sensors 26, 36, 66, or other sensors, may be an occupancy sensor. The building control devices 22, 32, 42, 62 and/or the host device 70 may receive a signal from the occupancy sensor indicative of occupancy within a room or zone of the building or structure 10. In response, the building control devices 22, 32, 42, and/or 62 may send a command to activate one or more building control component(s) located in or servicing the room or zone where occupancy is sensed.

Likewise, in some cases, at least one of the sensors 26 may be a temperature sensor configured to send a signal indicative of the current temperature in a room or zone of the building or structure 10. The building control device 22 may receive the signal indicative of the current temperature from a temperature sensor 26. In response, the building control device 22 may send a command to an HVAC device 24 to activate and/or deactivate the HVAC device 24 that is in or is servicing that room or zone to regulate the temperature in accordance with a desired temperature set point.

In yet another example, one or more of the sensors may be a current sensor. The current sensor may be coupled to the one or more building control components and/or an electrical circuit providing electrical power to one or more building control components. The current sensors may be configured to send a signal to a corresponding building control device, which indicates an increase or decrease in electrical current associated with the operation of the building control component. This signal may be used to provide confirmation that a command transmitted by a building control device has been successfully received and acted upon by the building control component(s). These are just a few examples of the configuration of the BMS 12 and the communication that can take place between the sensors and the control devices.

In some cases, data received from the BMS 12 may be analyzed and used to dynamically (e.g., automatically) trigger or provide recommendations for service requests, work orders, changes in operating parameters (e.g., set points, schedules, etc.) for the various devices 24, 34, 64, L1-L10, F1-F6 and/or sensors 26, 36, 66 in the BMS 12. In some cases, data received from the BMS 12 may be analyzed and used to dynamically (e.g., automatically) trigger or provide information regarding the health status of occupants of the building or area.

In yet other cases, data received from the BMS 12 may be analyzed and used to dynamically (e.g., automatically) trigger or provide information regarding noise levels or incidents generating noise in the building or area. It is contemplated that data may be received from the control devices 22, 32, 42, 62, devices 24, 34, 64, L1-L10, F1-F6, and/or sensors 26, 36, 66, as desired. In some cases, the data received from the BMS 12 may be combined with video data from image capturing devices of the security system. It is contemplated that the video data may be obtained from certain sensors 26, 36, 66 that are image capturing devices associated with discrete systems 20, 30, 60 of the BMS 12 or may be provided as separate image capturing devices such as video (or still-image) capturing cameras 80a, 80b (collectively 80), as desired. An "image" may include a still single frame image or a stream of images captured at a number of frames per second (e.g., video). While the illustrative building 10 is shown as including two cameras 80, it is contemplated that the building may include fewer than two or more than two cameras, as desired. It is further contemplated that the cameras (either discrete cameras 80 or cameras associated with a discrete system 20, 30, 60) may be considered to be "smart" edge cameras (which may be considered an Internet of Things (IoT) device), which are capable of independently processing the image stream, or "non-smart" cameras which are used as sensors to collect video information that is analyzed by an independent video analytics engine. Some illustrative cameras may include visible light security cameras, but may also include drones mounted cameras, thermovision (e.g. IR) cameras and/or any other suitable camera.

It is contemplated that data from the BMS 12 and/or the sensors 26, 36, 66, 80 may be systematically analyzing and compared to baseline data from the BMS 12 to monitor activities from individuals in different rooms/spaces within a building or building complex by recognizing their unique acoustic signatures. For example, real time audio data may be compared to audio models that are representative of normal sound profiles for a particular environment as well as abnormal sound profiles. The detection of abnormal sounds in an environment may trigger alerts such as, but not limited to, security alerts, maintenance alerts, etc. In some cases, the location of the source of the abnormal sound may be automatically identified, and a video feed of a video camera that is capturing the identified location may be automatically displayed.

Figure 2:
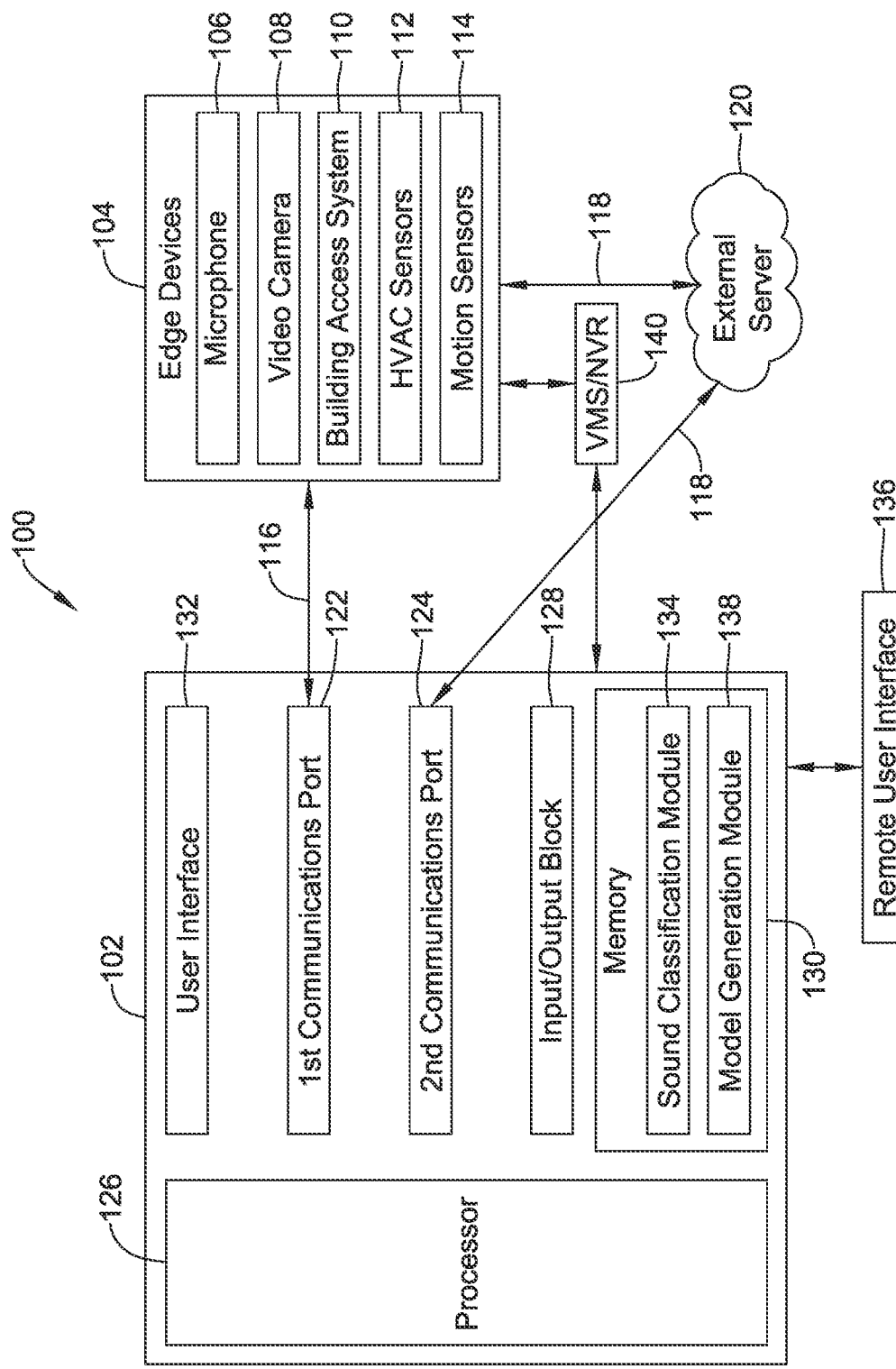
FIG. 2 is a block diagram of an illustrative sound profiling system for the video surveillance system of FIG. 1.

FIG. 2 is a schematic block diagram of an illustrative system 100 for identifying abnormal sounds in a particular environment. The system 100 may form a part of or be used in combination with any of the BMS systems 20, 30, 40, 50, 60 described above. For example, the system 100 may be in communication with any of the BMS systems 20, 30, 40, 50, 60 such that normal and/or abnormal sounds are correlated to or relative to operating cycles of the BMS systems 20, 30, 40, 50, 60 and/or normal behavior within the particular environment. In other examples, the system 100 may be a stand-alone system. It is also contemplated that the system 100 may be used in areas outside of a traditional building, such as, but not limited to, public transit or other areas where people may gather. In some cases, the system 100 can control one or more of an HVAC system, a security system, a lighting system, a fire system, a building access system and/or any other suitable building control system as desired.

In some cases, the system 100 includes a controller 102 and one or more edge devices 104. The edge devices 104 may include, but are not limited to, microphones (or other sound sensors) 106, still or video cameras 108, building access system readers or devices 110, HVAC sensors 112, motion sensors 114, and/or any of the devices or sensors described herein. In some cases, microphones (or other sound sensors) 106 may be provided as stand-alone network sensors. In some cases, the microphones 106 may be directional microphones that hear sounds from a particular direction or may be omni-directional microphones that hear sounds from all directions. In some cases, one or more microphones (or other sound sensors) 106 may be a part of or incorporated into one or more still or video cameras 108. The controller 102 may be configured to receive data from the edge devices 104, analyze the data, and make decisions based on the data, as will be described in more detail herein. For example, the controller 102 may include control circuitry and logic configured to operate, control, command, etc. the various components (not explicitly shown) of the system 100 and/or issue alerts or notifications.

The controller 102 may be in communication with any number of edge devices 104 as desired, such as, but not limited to, one, two, three, four, ten, one hundred, or more. In some cases, there may be more than one controller 102, each in communication with a number of edge devices. It is contemplated that the number of edge devices 104 may be dependent on the size and/or function of the system 100. The edge devices 104 may be selected and configured to monitor differing aspects or locations of the building and/or area of the system 100. For example, some of the edge devices 104 may be located interior of the building. In some cases, some of the edge devices 104 may be located exterior to the building. Some of the edge devices 104 may be positioned in an open area, such as a park or public transit stop. These are just some examples.

The controller 102 may be configured to communicate with the edge devices 104 over a first network 116, including a local area network (LAN) or a wide area network (WAN), or the connection may be made to an external computer (for example, through the Internet using an Internet Service Provider). Such communication can occur via a first communications port 122 at the controller 102 and a communication interface (not explicitly shown) at the edge devices 104. The first communications port 122 of the controller 102 and/or the communication interfaces of the edge devices 104 can be a wireless communications port including a wireless transceiver for wirelessly sending and/or receiving signals over a wireless network 116. However, this is not required. In some cases, the first network 116 may be a wired network or combinations of a wired and a wireless network.

The controller 102 may include a second communications port 124 which may be a wireless communications port including a wireless transceiver for sending and/or receiving signals over a second wireless network 118. However, this is not required. In some cases, the second network 118 may be a wired network or combinations of a wired and a wireless network. In some embodiments, the second communications port 124 may be in communication with a wired or wireless router or gateway for connecting to the second network 118, but this is not required. When so provided, the router or gateway may be integral to (e.g., within) the controller 102 or may be provided as a separate device. The second network 118 may be a wide area network or global network (WAN) including, for example, the Internet. The controller 102 may communicate over the second network 118 with an external web service hosted by one or more external web servers 120 (e.g., the cloud).

The controller 102 may include a processor 126 (e.g., microprocessor, microcontroller, etc.) and a memory 130. In some cases, the controller 102 may include a user interface 132 including a display and a means for receiving user input (e.g., touch screens, buttons, keyboards, etc.). In some cases, the user interface 132 may be integral to the controller 102. Alternatively, or additionally, the controller 102 may be operatively coupled to a remotely located user interface 136 including a display and a means for receiving user input. For example, the remotely located user interface 136 may be a display in a security monitoring station, a portable device, such as, but not limited to a smartphone, tablet computer, laptop computer, etc., or other such device. It is contemplated that the remote user interface 136 may communicate with the controller 102 via the first network 116 and/or the second network 118, as desired.

The memory 130 may be in communication with the processor 126. The memory 130 may be used to store any desired information such as, but not limited to, control algorithms, configuration protocols, set points, schedule times, diagnostic limits such as, for example, differential pressure limits, delta T limits, security system arming modes, audio classification models and the like. In some embodiments, the memory 130 may include specific control programs or modules configured to analyze data obtained from the edge devices 104 for a particular condition or situation. For example, the memory 130 may include, but is not limited to, a sound classification module 134 and a model generation module 138 which include instructions and/or data executable by the processor 126. The sound classification module 134 may be configured to detect sounds and/or activity that are abnormal for the particular environment, as will be described in more detail herein. The model generation module 138 may be configured to generate models of both expected sound profiles for a particular area and unexpected sound profiles for the particular area, as will be described in more detail herein. The memory 130 may include one or more of the sound classification modules 134 and model generation modules 138. In some cases, the memory 130 may include additional sound classification modules or model generation modules. The memory 130 may be any suitable type of storage device including, but not limited to, RAM, ROM, EPROM, flash memory, a hard drive, and/or the like. In some cases, the processor 126 may store information within the memory 130, and may subsequently retrieve the stored information from the memory 130.

In some embodiments, the controller 102 may include an input/output block (I/O block) 128 having a number of wire terminals for receiving one or more signals from the edge devices 104 and/or system components and/or for providing one or more control signals to the edge devices 104 and/or system components. For example, the I/O block 128 may communicate with one or more components of the system 100, including, but not limited to, the edge devices 104. The controller 102 may have any number of wire terminals for accepting a connection from one or more components of the system 100. However, how many wire terminals are utilized and which terminals are wired is dependent upon the particular configuration of the system 100. Different systems 100 having different components and/or types of components may have different wiring configurations. In some cases, the I/O block 128 may be configured to receive wireless signals from the edge devices 104 and/or one or more components or sensors (not explicitly shown). Alternatively, or in addition to, the I/O block 128 may communicate with another controller. It is further contemplated that the I/O block 128 may communicate with another controller which controls a separate building control system, such as, but not limited to a security system base module, an HVAC controller, etc.

In some cases, a power-transformation block (not explicitly shown) may be connected to one or more wires of the I/O block 128, and may be configured to bleed or steal energy from the one or more wires of the I/O block 128. The power bled off of the one or more wires of the I/O block may be stored in an energy storage device (not explicitly shown) that may be used to at least partially power the controller 102. In some cases, the energy storage device may be capacitor or a rechargeable battery. In addition, the controller 102 may also include a back-up source of energy such as, for example, a battery that may be used to supplement power supplied to the controller 102 when the amount of available power stored by the energy storage device is less than optimal or is insufficient to power certain applications. Certain applications or functions performed by the base module may require a greater amount of energy than others. If there is an insufficient amount of energy stored in the energy storage device then, in some cases, certain applications and/or functions may be prohibited by the processor 126.

The controller 102 may also include one or more sensors such as, but not limited to, a temperature sensor, a humidity sensor, an occupancy sensor, a proximity sensor, and/or the like. In some cases, the controller 102 may include an internal temperature sensor, but this is not required.

The user interface 132, when provided, may be any suitable user interface 132 that permits the controller 102 to display and/or solicit information, as well as accept one or more user interactions with the controller 102. For example, the user interface 132 may permit a user to locally enter data such as control set points, starting times, ending times, schedule times, diagnostic limits, responses to alerts, associate sensors to alarming modes, and the like. In one example, the user interface 132 may be a physical user interface that is accessible at the controller 102, and may include a display and/or a distinct keypad. The display may be any suitable display. In some instances, a display may include or may be a liquid crystal display (LCD), and in some cases an e-ink display, fixed segment display, or a dot matrix LCD display. In other cases, the user interface may be a touch screen LCD panel that functions as both display and keypad. The touch screen LCD panel may be adapted to solicit values for a number of operating parameters and/or to receive such values, but this is not required. In still other cases, the user interface 132 may be a dynamic graphical user interface.

In some instances, the user interface 132 need not be physically accessible to a user at the controller 102. Instead, the user interface may be a virtual user interface 132 that is accessible via the first network 116 and/or second network 118 using a mobile wireless device such as a smart phone, tablet, e-reader, laptop computer, personal computer, key fob, or the like. In some cases, the virtual user interface 132 may be provided by an app or apps executed by a user's remote device for the purposes of remotely interacting with the controller 102. Through the virtual user interface 132 provided by the app on the user's remote device, the user may change control set points, starting times, ending times, schedule times, diagnostic limits, respond to alerts, update their user profile, view energy usage data, arm or disarm the security system, configured the alarm system, and/or the like.

In some instances, changes made to the controller 102 via a user interface 132 provided by an app on the user's remote device may be first transmitted to an external web server 120. The external web server 120 may receive and accept the user inputs entered via the virtual user interface 132 provided by the app on the user's remote device, and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server 120 may update the control algorithm, as applicable, and transmit at least a portion of the updated control algorithm over the second network 118 to the controller 102 where it is received via the second communications port 124 and may be stored in the memory 130 for execution by the processor 126. In some cases, the user may observe the effect of their inputs at the controller 102.

Rather than a dedicated app, the virtual user interface 132 may include one or more web pages that are transmitted over the second network 118 (e.g. WAN or the Internet) by an external web server (e.g., web server 120). The one or more web pages forming the virtual user interface 132 may be hosted by an external web service and associated with a user account having one or more user profiles. The external web server 120 may receive and accept user inputs entered via the virtual user interface 132 and associate the user inputs with a user's account on the external web service. If the user inputs include changes to the existing control algorithm including any control set point changes, schedule changes, start and end time changes, window frost protection setting changes, operating mode changes, and/or changes to a user's profile, the external web server 120 may update the control algorithm, as applicable, and transmit at least a portion of the updated control algorithm over the second network 118 to the controller 102 where it is received via the second communications port 124 and may be stored in the memory 130 for execution by the processor 126. In some cases, the user may observe the effect of their inputs at the controller 102.

In some cases, a user may use either a user interface 132 provided at the controller 102 and/or a virtual user interface as described herein. These two types of user interfaces are not mutually exclusive of one another. In some cases, a virtual user interface 132 may provide more advanced capabilities to the user. It is further contemplated that a same virtual user interface 132 may be used for multiple BMS components.

As described above, the controller 102 may be alternatively or additionally in communication with a remote user interface 136 or display device via the first and/or second networks 116, 118. The remote user interface 136 may be located, for example, in a control room, a main office, a monitoring station, etc. Alternatively, or additionally, the remote user interface may be a portable device carried by a user (e.g., a smart phone, a tablet computer, a laptop, a watch, etc.). The remote user interface 136 may be a physical device or a virtual user interface (e.g., accessible via the internet) as described above. In some cases, the remote user interface may include a display and/or a distinct keypad. The display may be any suitable display. It is contemplated that in addition to being in communication with the controller 102, the remote user interface 136 may be in communication with other building control devices or systems including the edge devices 104.

The system 100 may further include a video management system (VMS) and/or network video recorder (NVR) 140. The VMS/NVR 140 may be in communication with the controller 102 and/or the edge devices 104 via the first and/or second networks 116, 118. The to VMS/NVR 140 may be configured to record images and/or video from the still or video cameras 108. In some cases, the VMS/NVR 140 may receive information from the controller 102 and control the field of view of one or more cameras 108 in response to the received information, although this is not required.

Figure 3:
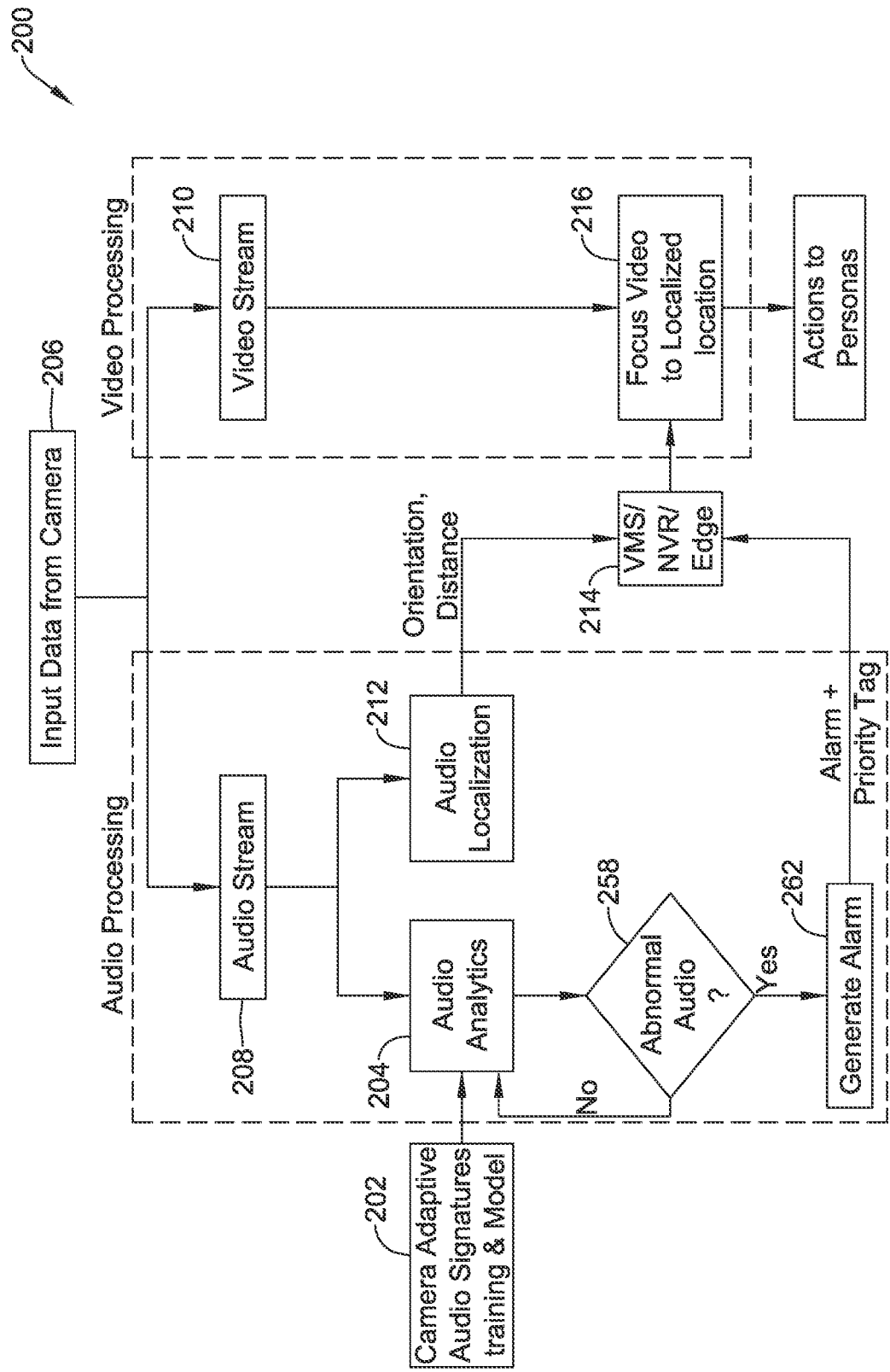
FIG. 3 is a flow chart of an illustrative method for performing video and audio analysis in the video surveillance system of FIG. 1.

It is contemplated that identifying and/or locating abnormal noises in a particular environment may provide information to a supervising user and/or parts of the BMS that may be used to more appropriately respond to irregularities in the particular environment. It is contemplated that the system 100 may detect abnormal sounds in a particular environment and to localize the abnormality by identifying the location and/or orientation of the abnormality. In some cases, the system 100 may further identify the abnormal sound(s). FIG. 3 illustrates a schematic flow chart 200 of an overview of an illustrative method and system for performing adaptive video and audio analysis. Generally, the system may detect abnormal audio signatures, localize the abnormality and send this information to the VMS/NVR 140 and/or other edge device 104 to change and/or select the field of view of one or more cameras 108 to the localized area. Also, the detection of abnormal audio can be a trigger to send messages to required personnel for appropriate action.

Figure 4:
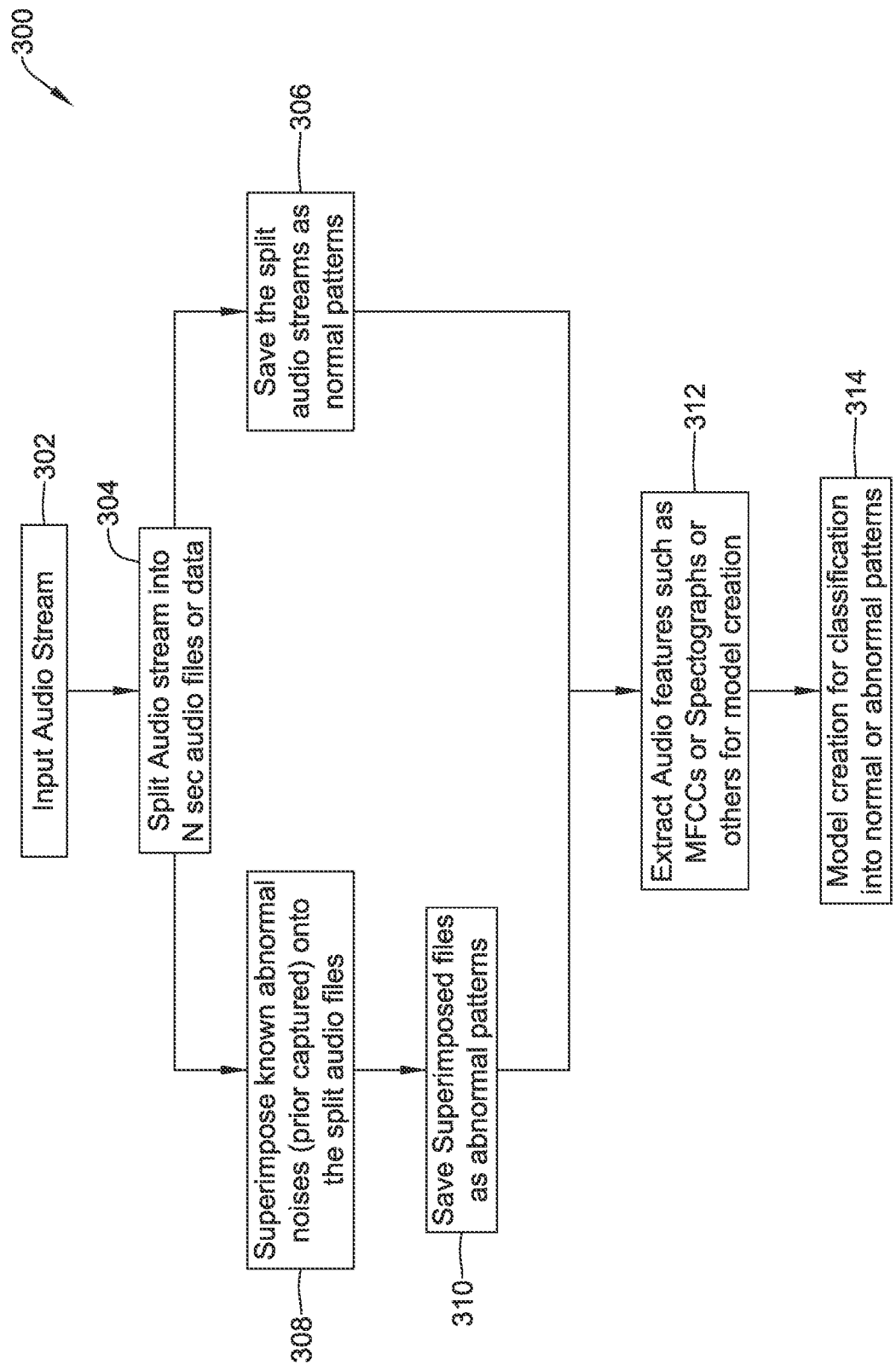
FIG. 4 is a flow chart of an illustrative method for generating audio models for use in classifying audio noises in an audio stream.

Initially, the system 100 receives camera adaptive audio signatures and models 202. The audio signatures and models 202 may be stored within the memory 130 of the controller 102, within the sound classification module 134 or generically, an audio analytics module. Reference will now be made to FIG. 4 which illustrates a schematic flow chart of an illustrative method 300 for generating the camera-adaptive signatures and models 202. These may be generated on-site so that the background acoustics of the particular environment can be accounted for. As noted above, cameras 108 and sound sensors 106 are deployed in different environments such as roads, facilities, commercial establishments, etc. Each of these environments have different routine or normal noises associated with them. For example, cameras on roads pick up traffic noise and cameras in facilities and commercial establishments can pick up machine noise, people talking, etc. In some cases, the system 100 is trained to recognize abnormal sounds or noises for the particular environment using deep neural artificial intelligence (AI) training. It is contemplated that the gathering and analysis of the audio streams used to generate the models may be performed by the same controller (e.g., controller 102) that is used for operational analysis or may be a separate controller or computer, as desired. The training period may occur continuously or at predetermined intervals over a period of time, such as, but not limited to, hours, days, weeks, etc. When so provided, this may allow the system 100 to train for abnormal sound detection under a variety of conditions. For example, people talking may be considered to be normal audio during the day in an office building while people talking in the middle of the night in an office building may be considered abnormal. This is just one example.

To begin, and in one example, the controller 102 is placed into a training mode and audio is received from one or more microphones 106 located in the particular environment during normal usage of the particular environment 302 when no abnormal audio events are present. It should be understood that the particular environment may include one or more microphones 106. Audio may be received and processed from each microphone 106 that is present in the particular area. It is further contemplated that a building or space may include more than one environment that is separately trained and analyzed since the use of such space may be different and the acoustics of such space may be different. To increase the accuracy of the models, at least some of the training may be done while the particular environment is being used for its intended purpose. For example, in an airport, at least some of the training may be done when the airport is open and servicing passengers. The one or more microphones may be stand alone network sound sensors each with a unique IP address, one or more microphones may be incorporated into a security camera, or combinations thereof. The IP address of the network sound sensors and/or a camera ID may be used to identify from which microphone the audio was acquired (both during training and normal operation), and to identify a physical location of the sound sensor within the particular environment. The physical location and/or the directional orientation of each microphone 106 and/or camera 108 may be stored in an electronic database within the memory 130 of the controller 102, on the external server 120 and/or within the VMS/NVR 140. By supplying an identify of a particular microphone 106 and/or camera 108 to the electronic database, the electronic database may return the corresponding physical location and/or the directional orientation of the particular microphone 106 and/or camera 108.

It is contemplated that the audio stream 302 may include audio from a single microphone 106 or may include a plurality of audio streams from a plurality of microphones 106 which are collected concurrently. When audio inputs are received from more than one sound sensor concurrently, the audio streams may be individually analyzed as microphones in different physical locations may record differing audio profiles during normal usage of the environment. The normal audio streams may be used as a baseline when subsequently processing incoming audio streams with the controller 102 or processor 126 to determine whether the incoming audio streams received from one or more microphones in the particular environment includes an abnormal audio event for the particular environment.

In some cases, as the controller 102 receives an audio stream, the controller 102 may split or segment the normal audio stream into N second audio files 304 to form a plurality of normal audio clips or files. For example, the input audio stream may be split into audio clips of one second, two second, three second, four second segments, or longer, as desired. Each of these N second audio files may be saved as normal sound patterns 306. It is contemplated that if an abnormal sound occurs during the training period or training mode, a supervising user may remove the corresponding audio file from the saved N second audio files. The same N second audio clips may then be used to prepare a plurality of abnormal audio clips. For example, known abnormal sounds or noises which have been previously captured may be superimposed 308 over the N second normal audio clips to create abnormal audio clips with the normal audio clips as background noise. The known abnormal sounds or noises may include, but are not limited to, screams, loud voices, gun shots, glass breaks, machine noise, etc. The prepared or altered audio clips are then saved as abnormal audio clips 310.

An audio classification model may be trained to identify abnormal audio events in the particular environment using one or more of the plurality of normal audio clips and one or more of the plurality of abnormal audio clips. For example, audio features such as, but not limited to, Mel-frequency cepstral coefficients (MFCCs), spectrographs, zero crossing, signal energy, energy-entropy, spectrum centroid, spectrum spread, spectrum roll-off, spectrum entropy, etc., may be extracted from the normal audio and the abnormal audio 312. These audio features may then be used to create one or more audio classification models for classification of future audio files into normal or abnormal patterns 314. The audio classification models may be used in determining whether an incoming audio stream from the particular environment during an operation mode includes an abnormal audio event for the particular environment. For example, real time audio received during an operational mode of the system 100 can then be compared to the stored audio classification models to determine if the real time audio is classified as normal or abnormal. The audio classification models may include identifying characteristics such as, but not limited to, an identity of the microphone from which the normal audio stream was obtained, a physical location of said microphone, a time of day, a day of the week, etc. This may allow the system 100 to compare incoming audio streams to training audio obtained under similar operating conditions.

Returning to FIG. 3, once the audio classification models 202 are trained and stored within a memory 130 of the controller 102, an operational mode may be initiated. In the operational mode, real time audio and video data 206 is received from one or more cameras 108 and/or one or more microphones 106. The input data 206 may be split into audio data streams 208 and video data streams 210. In some cases, a video camera 108 may house the microphone 106 and provide both the incoming audio stream 208 and the incoming video stream 210. In other cases, the video camera 108 may be housed separately from the microphone 106 with the microphone addressed separately from the video camera. The real time audio data streams 208 may be analyzed using audio analytics 204 (e.g., the sound classification modules 134) to determine if the audio data streams 208 include abnormal sounds or noises.

Figure 5:
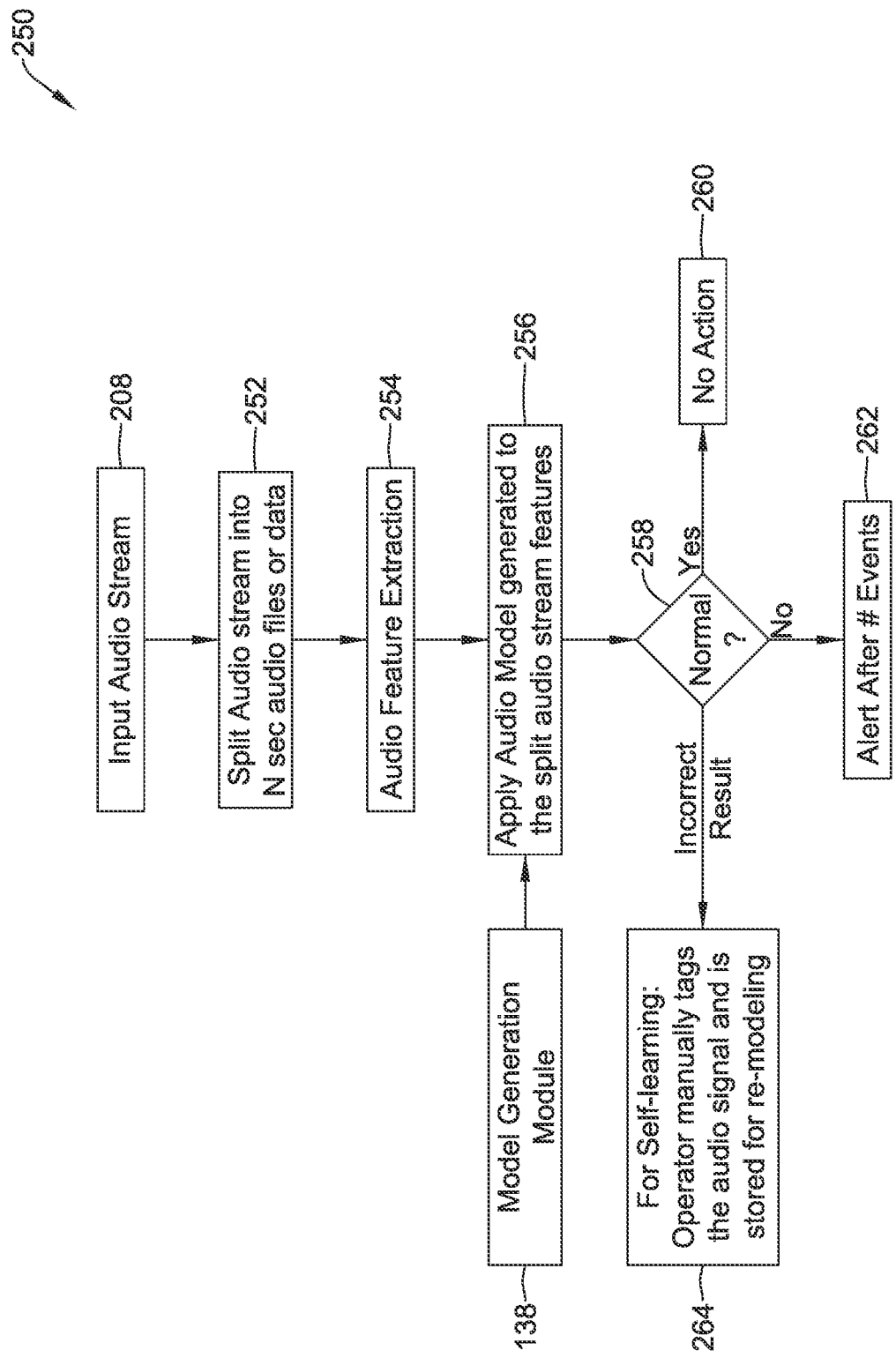
FIG. 5 is a flow chart of an illustrative method for identifying abnormal audio events using the audio model generated using the method of FIG. 4.

Reference will now be made to FIG. 5 which illustrates a schematic flow chart of an illustrative method 250 for performing the audio analytics 204 (e.g., analyzing incoming or real time audio data for identifying abnormal sounds in a particular environment). As described above, the analysis of the audio data stream(s) 208 may be performed by a controller 102 or processor 126 and in some cases, for example, executes instructions stored within a dedicated module, such as, but not limited to the sound classification module 134. To begin, an incoming audio stream is split into N second audio files 252 to form a plurality of audio clips. For example, the audio stream 208 may be split into audio clips of one second, two second, three second, four second segments, or longer, as desired. In some cases, the incoming audio stream may be split into segments having the same length as the audio clips during the training phase, although this is not required. Next audio features such as, but not limited to, Mel-frequency cepstral coefficients (MFCCs), spectrographs, zero crossing, signal energy, energy-entropy, spectrum centroid, spectrum spread, spectrum entropy, spectrum roll-off, etc. may be extracted from the incoming audio segments 254.

The audio classification models generated during the training phase may be accessed from the model generation module 138 and applied to the audio features of the plurality of incoming audio clips 256. The controller 102 may identify similarities between the incoming split audio stream features and the audio classification models. The controller 102 may further use this comparison to determine if the audio stream includes normal sounds or noises 258. For example, if the incoming split audio stream features are similar to the audio features of a normal sound audio model, the controller 102 may determine the sounds are normal or expected and take no further action 260. If the incoming split audio stream features are similar to the audio features of an abnormal sound audio model, the controller 102 may determine the sounds are abnormal or unexpected, and in the example shown in FIG. 5, initiate a counter. After the counter reaches a predetermined number of abnormal sound events, the controller 102/processor 126 may determine that the incoming audio stream includes an abnormal audio event for the particular environment.

When an abnormal audio event is detected, the controller 102/processor 126 may access the electronic database to determine the location of the microphone 106 that recorded the abnormal sound event, which correlates to the location of the abnormal sound event. In some cases, in addition to the physical location of the microphone 106, the controller 102/processor 126 may access the electronic database to determine a directional orientation (when the microphone 106 is a directional microphone) of the microphone 106. Thus, the location of the abnormal sound event may be determined based at least in part on the physical location of the microphone 106 and a directional orientation of the microphone 106. As will be described in more detail herein, the controller 102/processor 126 (and/or the VMS/NVR 140) may also use the electronic databased to identify a video camera 108 that has a field of view that includes the location of the abnormal audio event in the particular environment. The video stream from the identified video camera may be retrieved and displayed on a display (such as, but not limited to, the remote user interface 136). In some cases, of the video camera 108 is a pan/tilt/zoom (PTZ) camera, the controller 102/processor 126 may send a PTZ command to the particular video camera to direct the field of view of the particular video camera at the location of the detected abnormal audio event.

If is further contemplated that after a predetermined number of abnormal sound events, an alert may be generated 262 and transmitted to an operator. It is contemplated that the alert may be sent to a remote or mobile device of a supervisor or other user or to the VMS/NVR 140. The notification may be a natural language message providing details about the abnormal sounds, an origination location, and/or a recommended action. In some cases, the alert may trigger an additional action to be taken by the BMS 12. For example, a workplace disturbance or security threat may result in the automatic locking of one or more doors of the building. In another example, an equipment malfunction alert may result in a shutdown of a piece of equipment. There are just some examples.

In some cases, an operator or user may be presented incoming audio clips and may manually tag or classify the clips as normal or abnormal 264. These tagged clips may be saved in the VMS/NVR 140 for further refining the model through self-learning techniques. For example, the audio classification model may be a self-learning model. Some of the self-learning techniques may include on-site learning mechanisms such as reinforcement learning or transfer learning. The audio classification models may be updated based on the classification received from the operator. In some cases, only abnormal audio events (or subsets thereof) may be presented to the operator. In other cases, only normal audio events (or subsets thereof) may be presented to the operator. In yet other cases, both abnormal and normal audio events (or subsets thereof) may be presented to the operator. In one example, incoming audio clips that have been determined to be or classified as abnormal audio events may be presented to the operator. The operator may then input a classification that the determined abnormal audio event is indeed an abnormal audio event or should be considered a normal audio event for the particular environment. The audio classification model may then be updated based on the classification received from the operator. In some cases, the audio classification model may classify an audio into more classifications than just normal and abnormal. For example, the audio classification model may be trained to classify abnormal audio events into classes that indicate a severity or threat level, such as low, medium and high. This may help an operator prioritize detected abnormal audio events.

Returning to FIG. 3, in addition to performing audio analytics 204, the controller 102/processor 126 may perform audio localization 212 in parallel to the audio analytics 204. For example, as noted above, the controller 102 may use the IP address of a network sound sensor or the ID number (or IP address) of a camera to determine a physical location of the sensor which has received the audio being analyzed. It is contemplated that the physical locations of the sensors along with their identifier may be stored in an electronic database in the memory 130 of the controller 102. When the microphone 106 is a directional microphone, the directional orientation of the microphone 106 may also be stored in the electronic database. It is further contemplated that the controller 102 may be configured to determine how far away from the sound sensor the audio originated. This may be performed by analyzing a volume of the sound and determining if other nearby sound sensors have similar audio signatures. Based on triangulation, the approximate location of the source of the sound may be determine. The controller 102 may send the localization information 214 to the VMS/NVR 140 or other edge device 104, to be stored for record keeping, used for the improvement of the sound classification models, and/or to facilitate further action when an abnormal sound event is detected.

Additionally, or alternatively, audio localization 212 may be performed using peer to peer communications for signaling audio abnormalities from the respective audio sensor or microphone 106 to the nearest or configured camera 108, when that the audio sensors 106 are networked sensors. The audio stream identifier or the IP address of the networked audio sensor may identify the microphone 106 from which the abnormal audio signatures are detected (and thus the approximate location). Peer to peer communication between an edge device 104 or the camera 108 and the networked audio sensors/microphones 106 may convey the abnormality alert. As described herein, the orientation and the audible field of view may be considered to localize the audio abnormality.

As described with respect to FIG. 5, when an abnormal sound event is detected, an alarm may be generated 262. The alarm may be transmitted directly to responsible personnel or may be sent to a VMS/NVR 140 or other edge device 104. The alarm 262 may include an indication of an abnormal sound event and/or a priority level. For example, the alarm 262 may include a priority classification indicating a level of urgency (e.g., high, medium, low). In some cases, the VMS/NVR 140, or other edge device 104 may use the alert 262 in combination with the audio localization data 212 to determine which camera is closest to the source of the abnormal sound event or which camera has the best view of the source location. For example, in some cases, the alert may be sent directly to an identified camera 108. The identified camera 108 can then transmit its video feed or adjust its field of view. In the event the camera is a pan-tilt-zoom (PTZ) camera, the position of the camera may be adjusted to focus the view of the camera on the localized location 216. In some cases, focusing the camera on the localized location may include selecting the camera which has the best view without moving a position of the camera. The live video feed from the camera directed towards the localized location may then be transmitted to responsible personnel along with other relevant information. The personnel may then use the video feed to verify the abnormal sound event, if possible, and take further action. In some cases, the personnel may generate maintenance requests. In other cases, the personnel may call emergency responders. In yet other cases, the personnel may travel to the localized location to investigate the abnormal sound event. These are just some examples. It should be understood that the action taken by the personnel may be unique to the particular environment and the type of abnormal sound event. In some cases, there may not be a camera which is capable of capturing the location of the sound. In such an instance, the operator may be notified that no video feed is available.

Figure 6:
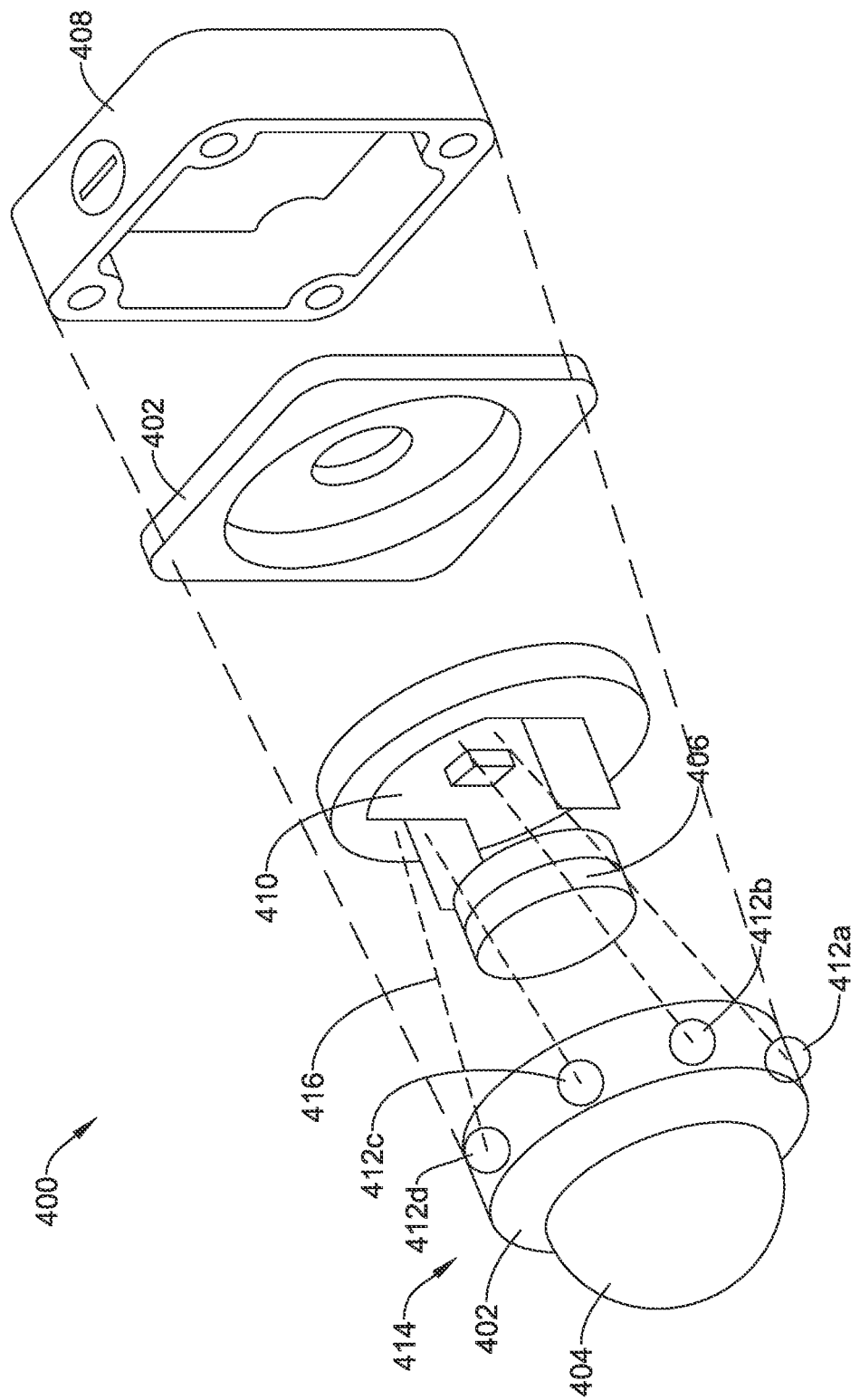
FIG. 6 is an illustrative video camera with audio sensors.

In some cases, audio localization may be performed via an audio-video camera, which has embedded audio sensors or microprocessors into the periphery of the camera. FIG. 6 illustrates an exploded perspective view of an illustrative audio-video camera 400. Generally, multiple directional microphones may be embedded on or in a housing near the front of camera. The camera may be placed to cover 360-degree orientation (or other desired angular spans such as 90-degrees, 180-degrees, etc.).

The audio-video camera 400 of FIG. 6 does not show all structural and/or functional elements of a video camera, but for clarity, just some of the elements are shown. The illustrative audio-video camera 400 may include a housing 402 for enclosing the components of the audio-video camera 400. The housing 402 may include multiple components configured to be secured to one another. In some cases, the audio-video camera 400 may be a dome camera including a transparent protective dome 404. However, this is not required. In some cases, the audio-video camera 400 may be bullet camera. The audio-video camera 400 may have a fixed field of view or may be a pan-tilt-zoom (PTZ) camera, as desired. It is contemplated that the audio-video camera 400 may be for indoor and/or outdoor use and for day and/or night use, as desired. In some cases, the housing 402 may be weatherproof for use outside or one or more night vision light emitting diodes (LED) may be provided adjacent to the dome 404 for night use.

Within the housing 402, the illustrative audio-video camera 400 may include or house a camera or lens 406. The lens 406 may be configured to direct incoming light towards an image sensor (not explicitly shown). The image sensor may process the light captured by the lens 406 into a digital signal. The digital signal (e.g., the video recording) may be stored in a memory (not explicitly shown) of the audio-video camera 400 or transferred to a VMS or NVR (such as, but not limited to, VMS/NVR 140). In some cases, the image sensor may be provided as a part of or otherwise communicatively coupled to a control printed circuit board 410, although this is not required. The control printed circuit board 410 may include a processor or controller (not explicitly shown). While some components are described as being a part of the control printed circuit board 410, these components may be provided separate from control printed circuit board 410. In some cases, the controller may be configured to poll various sensors for data, analyze the sensor data, and determine where a sound or noise originated. The controller may also be in communication with, or operatively coupled to a memory (not explicitly shown). The memory may be used to store any desired information, such as, but not limited to, machine instructions for how to process data from the sensors and/or digital signals from the image sensor. The memory may be any suitable type of storage device including, but not limited to, RAM, ROM, EPROM, flash memory, a hard drive, and/or the like. In some cases, the controller and/or image sensor may store information within the memory, and may subsequently retrieve the stored information from the memory.

In some embodiments, the audio-video camera 400 may be equipped with a communications module. The communications module may allow the audio-video camera 400 to communicate with other components of the BMS 12 or the system 100 for identifying abnormal sounds in a particular environment, such as, but not limited to a network video recorder (NVR) and/or a remote monitoring station. The communications module may provide wired and/or wireless communication. In one example, the communications module may use any desired wireless communication protocol such as but not limited to cellular communication, ZigBee, REDLINK™, Bluetooth, WiFi, IrDA, dedicated short range communication (DSRC), EnOcean, and/or any other suitable common or proprietary wireless protocol, as desired. In another example, the communications module may communicate over a network cable. In some cases, the network cable may be a power over Ethernet (POE) cable. The illustrative video camera 400 may receive power over a POE cable, a separate power cable, a battery, or any other suitable power source, as desired.

The illustrative audio-video camera 400 may further include a back box 408. The back box may form a part of the housing 402 or may mounted to the housing 402 to mount the audio-video camera 400 to a wall or ceiling. In some cases, the back box 408 may be coupled to an exterior of the housing 402 while in other cases, the back box 408 may be within or interior to the housing 402. In some cases, the back box 408 may house cable connections. For example, the back box 408 may house a connection between, for example: a network cable and the control printed circuit board 410, a connection between a power cable and the control printed circuit board 410, and/or an audio cable and the control printed circuit board 410. It is contemplated that the audio-video camera 400 may include other cables and/or connections, as desired. In some cases, the connection between the video camera 400 and the network may be tested using the internal circuitry of the connection ports within the back box 408. The ports may include LEDS which glow a certain color to indicate connectivity.

The audio-video camera 400 may further include one or more directional microphones 412*a*, 412*b*, 412*c*, 412*d* (collectively, 412) embedded in a thickness of the housing 402 or disposed within an interior of the housing 402, as desired, adjacent a front end 414 thereof. The directional microphones 412 may receive sound from a primary audio direction or a predetermined angle. For example, the directional microphones 412 may each receive sounds over angle ranges of about 5°, about 10°, about 15°, etc. It is contemplated that the angles may be less than 5° or greater than 15°, as desired. For example, an omni-directional microphone may be a type of directional microphone that receives sounds over 360°. The directional microphones 412 may be oriented to have a uniform angular spacing or may be eccentrically spaced about the perimeter of the housing 402, as desired. The directional microphones 412 may be carried by the housing 402 such that each microphone 412 is orientated in a different direction from the housing 402 such that an approximate direction of a sound event emanating from the particular environment can be determined. In some cases, the number of directional microphones 412 used may be determined by the angle of the directional microphone as well as the desired coverage. For example, to achieve 360° coverage with directional microphones 412 having a coverage angle of 5°, seventy-two to microphones may be used.

Each directional microphone 412 may be identified using an identifier in the audio stream or using an IP address. The directional microphones 412 may receive sounds only from a predetermined direction corresponding to the directional orientation of the microphone 412. Thus, the location of the sound can be determined based on the directional microphone 412 that received the sound. In some cases, sounds can be captured by multiple directional microphones 412. In such an instance, the directional microphone which has the strongest signal may be used to determine which direction the sound is coming from.

It is contemplated that the directional microphones 412 may be operatively coupled 416 to the control printed circuit board 410 such that the control printed circuit board 410 can process the audio and/or transmit the audio. For example, the controller and/or control printed circuit board 410 may be configured determine the approximate direction of the sound event emanating from the particular environment using the plurality of directional microphones 412. The controller and/or control printed circuit board 410 may be configured to control the field of view of the camera 400 (e.g., a PTZ camera) to face the determined approximate direction of the sound event in order to capture a video stream of a source of the sound event. Alternatively, or additionally, the controller or the control printed circuit board 410 may be configured to provide an audio and video output to a remote device.

Figure 7:
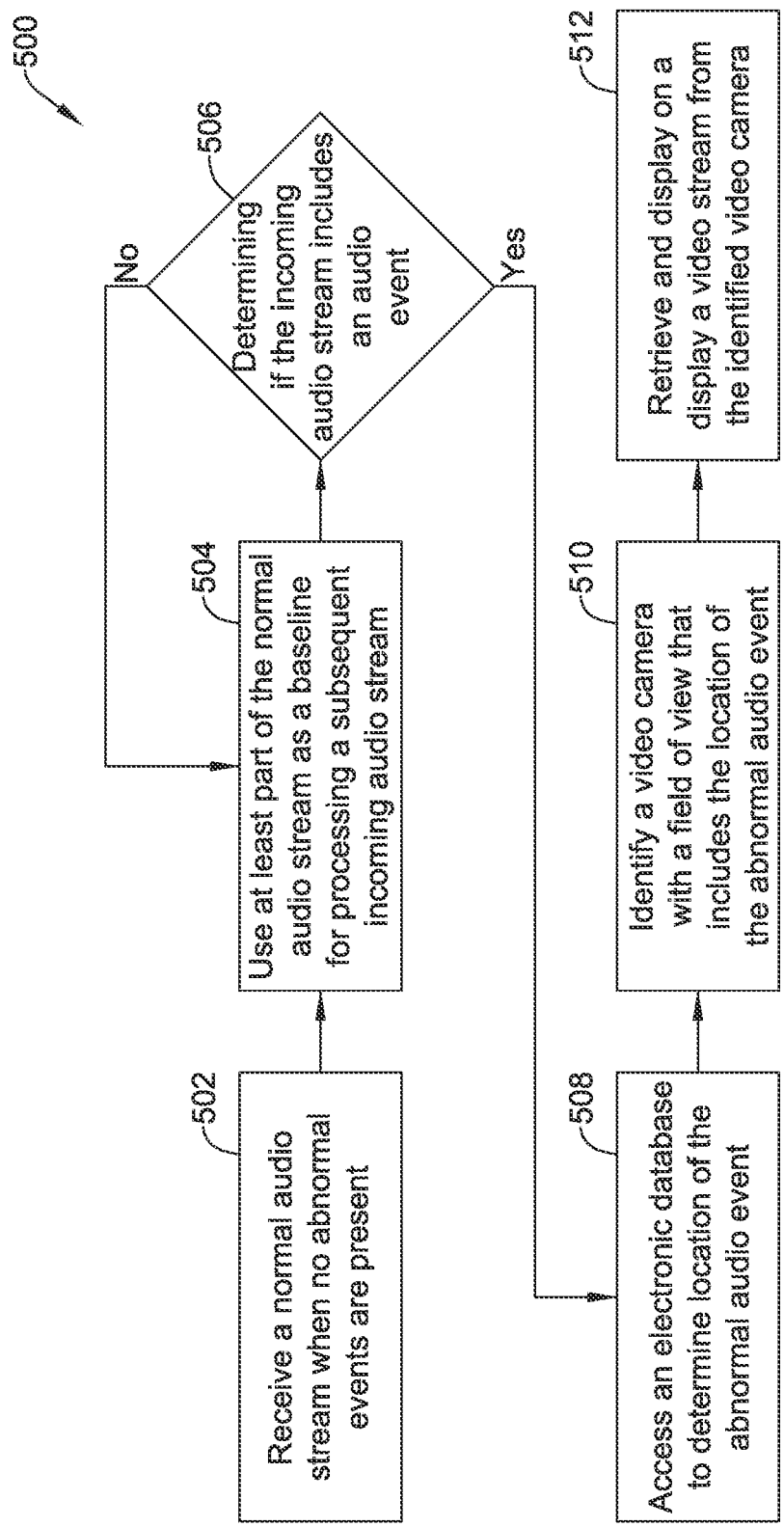
FIG. 7 is another illustrative method for performing video and audio analysis in the video surveillance system of FIG. 1.

FIG. 7 illustrates a schematic flow chart 500 of an overview of another illustrative method and system for performing adaptive video and audio analysis. Generally, the system may detect abnormal audio signatures, localize the abnormality and send this information to the VMS/NVR 140 and/or other edge device 104 to change and/or select the field of view of one or more cameras 108 to the localized area. Also, the detection of abnormal audio can be a trigger to send messages to required personnel for appropriate action. To begin, the system 100 may receive a normal audio stream from one or more microphones 106 located in a particular environment when no abnormal events are present, as shown at block 502. In some cases, the normal audio stream may be collected during a training period or mode. The normal audio stream may then be used as a baseline for subsequently processing an incoming audio stream with a processor 126, as shown at block 504. The incoming audio stream may be processed when the system 100 is in an operational mode.

The normal audio stream may be used to determine whether the incoming audio stream from the microphone 106 in the particular environment includes an abnormal audio event for the particular environment, as shown at block 506. This may be done using any of the techniques described herein. If the normal audio stream does not include abnormal audio events for the particular environment, the processor 126 may continue processing the incoming audio stream. If it is determined that the incoming audio stream includes an abnormal audio event for the particular environment, an electronic database is accessed to determine a location of the abnormal audio event in the particular environment, as shown at block 508. As described above, a physical location of the microphone 106 and/or a directional orientation of the microphone 106 may be used stored in the electronic database and may be used, at least in part, to determine a location of the abnormal audio event.

Once the location of the abnormal audio event has been determined, a video camera 108 with a field of view that includes the location of the abnormal audio event in the particular environment may be identified, as shown at block 510. The video stream from the identified video camera may then be retrieved and displayed on a display, as shown at block 512.

Figure 8:
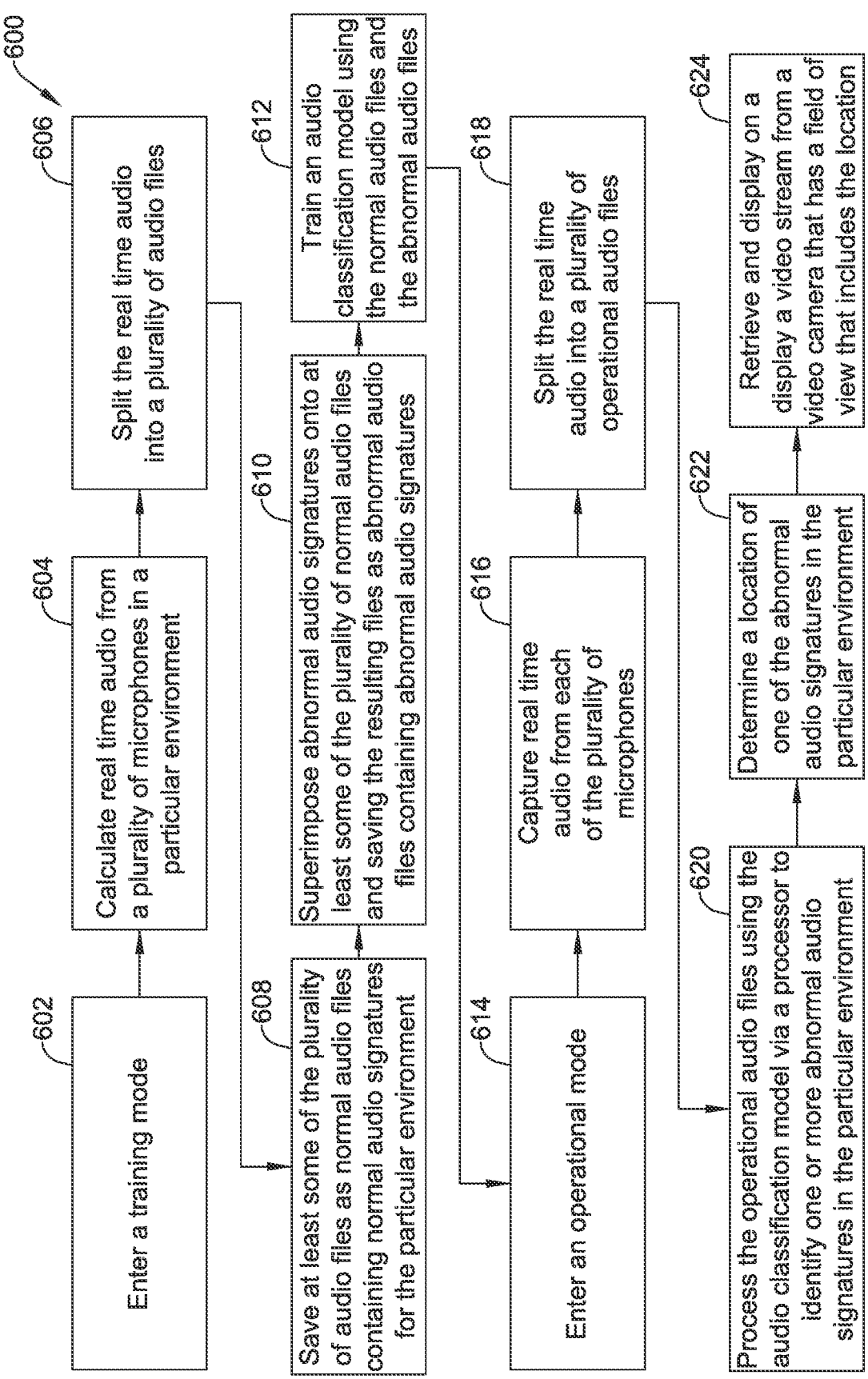
FIG. 8 is another illustrative method for performing video and audio analysis in the video surveillance system of FIG. 1.

FIG. 8 illustrates a schematic flow chart 600 of an overview of another illustrative method and system for performing adaptive video and audio analysis. Generally, the system may detect abnormal audio signatures, localize the abnormality and send this information to the VMS/NVR 140 and/or other edge device 104 to change and/or select the field of view of one or more cameras 108 to the localized area. Also, the detection of abnormal audio can be a trigger to send messages to required personnel for appropriate action. To begin, the system 100 may enter a training mode, as shown at block 602. While in the training mode, the system 100 may capture real time audio from a plurality of microphones in a particular environment, as shown at block 604. The real time audio may be split into a plurality of audio files, as shown at block 606. At least some of the plurality of audio files may be saved as normal audio files containing normal audio signatures for the particular environment, as shown at block 608. Abnormal audio signatures may be superimposed onto at least some of the plurality of normal audio files and the resulting files saved as abnormal audio files containing abnormal audio signature, as shown at block 610. An audio classification model may be trained using the normal audio files and the abnormal audio files, as shown at block 612.

The system 100 may then enter an operational mode, as shown at block 614. While in the operational mode, real time audio may be captured from each of the plurality of microphones, as shown at block 616. The real time audio may be split into a plurality of operational audio files, as shown at block 618. The operational audio files may then be processed using the audio classification model via a processor to identify one or more abnormal audio signatures in the particular environment, as shown at block 620. This may be done using any of the techniques described herein. A location of one of the abnormal audio signatures in the particular environment may be determined, as shown at block 622. As described above, a physical location of the microphone 106 and/or a directional orientation of the microphone 106 may be used stored in the electronic database and may be used, at least in part, to determine a location of the abnormal audio event. A video stream from a video camera that has a field of view that includes the location may then be retrieved and displayed on a display, as shown at block 624.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for identifying abnormal sounds in a particular environment, the method comprising:
   capturing a real time normal audio stream over a training period of time during normal usage of the particular environment from a microphone located in the particular environment when no abnormal audio events are present, wherein the real time normal audio stream is representative of a background noise profile for the particular environment;
   dividing the real time normal audio stream captured during the training period of time into a plurality of normal audio clips;
   preparing a plurality of abnormal audio clips by superimposing known abnormal audio events onto one or more of the plurality of normal audio clips;
   training an audio classification model to identify abnormal audio events in the particular environment using one or more of the plurality of normal audio clips and the plurality of abnormal audio clips;
   using the audio classification model for subsequently processing an incoming audio stream with a processor to determine whether the incoming audio stream from the microphone in the particular environment includes an abnormal audio event relative to the background noise profile identified for the particular environment;
   when it is determined that the incoming audio stream includes an abnormal audio event for the particular environment, determine a location of the abnormal audio event in the particular environment; and
   retrieving and displaying on a display a video stream from a video camera that has a field of view that includes the location of the abnormal audio event in the particular environment.

2. The method of claim 1, wherein the audio classification model is a self-learning model.

3. The method of claim 2, wherein the self-learning model uses reinforcement learning and/or transfer learning.

4. The method of claim 1, further comprising:
   presenting one or more determined abnormal audio event to an operator;
   receiving a classification from the operator that the determined abnormal audio event is indeed an abnormal audio event or should be considered a normal audio event for the particular environment; and
   updating the audio classification model based on the classification received from the operator.

5. The method of claim 1, wherein determining the location of the abnormal audio event in the particular environment is based at least in part on a physical location of the microphone in the particular environment stored in the electronic database.

6. The method of claim 5, wherein the microphone is a directional microphone with a directional orientation, and wherein determining the location of the abnormal audio event in the particular environment is based at least in part on the physical location of the microphone in the particular environment and the directional orientation of the microphone.

7. The method of claim 1, wherein the video camera comprises a housing that houses the microphone, and provides the incoming audio stream and the video stream.

8. The method of claim 1, wherein the video camera is housed separately from the microphone, and the microphone is addressed separately from the video camera.

9. The method of claim 1, further comprising sending an alert to an operator when it is determined that the incoming audio stream includes an abnormal audio event for the particular environment.

10. A method for identifying abnormal sounds in a particular environment, the method comprising:
   entering a training mode and while in the training mode:

capturing real time training audio over a period of time from a plurality of microphones in the particular environment when no abnormal audio events are present in the particular environment, wherein the real time training audio is representative of a background noise profile for the particular environment;

splitting the real time training audio into a plurality of audio clips;

saving at least some of the plurality of audio clips as normal audio clips containing normal audio signatures for the particular environment;

superimposing abnormal audio signatures onto at least some of the plurality of normal audio clips and saving the resulting clips as abnormal audio clips containing abnormal audio signatures;

training an audio classification model using the normal audio clips and the abnormal audio clips;

entering an operational mode, and while in the operational mode:

capturing real time operational audio from each of the plurality of microphones;

splitting the real time operational audio into a plurality of operational audio clips;

processing the operational audio clips using the audio classification model via a processor to identify one or more abnormal audio signatures in the particular environment;

determining a location of one of the abnormal audio signatures in the particular environment; and retrieving and displaying on a display a video stream from a video camera that has a field of view that includes the location.

11. The method of claim 10, further comprising receiving a user input confirming or rejecting the identification of the abnormal audio signatures.

12. The method of claim 11, wherein the audio classification model is updated based on the user input.

13. The method of claim 10, wherein the audio classification model is a self-learning model.

14. The method of claim 13, wherein the self-learning model uses reinforcement learning and/or transfer learning.

15. A system for identifying abnormal sounds in a particular environment, the system comprising:

a microphone located in the particular environment;

one or more video cameras each having a field of view;

a controller operatively coupled to the microphone and the one or more video cameras, the controller configured to:

capture a real time normal audio stream from the microphone during a training period under which the particular environment is under normal usage when no abnormal audio events are present, wherein the real time normal audio stream is representative of a background noise profile for the particular environment;

prepare a plurality of normal audio clips based on the real time normal audio stream;

prepare a plurality of abnormal audio clips by superimposing known abnormal audio events onto at least part of the real time normal audio stream;

train an audio classification model to identify abnormal audio events in the particular environment using one or more of the plurality of normal audio clips and the plurality of abnormal audio clips; and use the audio classification model for subsequently processing an incoming audio stream to identify an abnormal audio event in the incoming audio stream.

16. The system of claim 15, wherein the controller is configured to:

when it is determined that the incoming audio stream includes an abnormal audio event, determine a location of the abnormal audio event in the particular environment; and display on a display a video stream from one or more video cameras of the one or more video cameras that has a field of view that includes the location of the abnormal audio event in the particular environment.

17. The system of claim 15, wherein the controller is configured to:

present one or more determined abnormal audio event to an operator;

receive a classification from the operator that the determined abnormal audio event is indeed an abnormal audio event or should be considered a normal audio event for the particular environment; and update the audio classification model based on the classification received from the operator.

18. The system of claim 15, wherein the audio classification model is a self-learning model.

19. The system of claim 18, wherein the self-learning model uses reinforcement learning and/or transfer learning.

* * * * *